US012658683B2

(12) United States Patent (10) Patent No.: US 12,658,683 B2
Witherbee et al. (45) Date of Patent: Jun. 16, 2026

(54) MOUNTING BRACKET FOR ELECTRICAL BOX

(71) Applicant: Eaton Intelligent Power Limited, Dublin (IE)

(72) Inventors: Martin Lee Witherbee, Godfrey, IL (US); Shane Amedeo Semple, Canonsburg, PA (US)

(73) Assignee: Eaton Intelligent Power Limited, Dublin (IE)

( * ) Notice: Subject to any disclaimer, the term of this patent is extended or adjusted under 35 U.S.C. 154(b) by 176 days.

(21) Appl. No.: 18/436,061

(22) Filed: Feb. 8, 2024

(65) Prior Publication Data

US 2024/0275150 A1     Aug. 15, 2024

Related U.S. Application Data

(60) Provisional application No. 63/484,036, filed on Feb. 9, 2023.

(51) Int. Cl.
H02G 3/00 (2006.01)
H02G 3/10 (2006.01)

(52) U.S. Cl.
CPC .................................... *H02G 3/10* (2013.01)

(58) Field of Classification Search
CPC ....................................................... H02G 3/10
See application file for complete search history.

(56) References Cited

U.S. PATENT DOCUMENTS

2017/0093140 A1* 3/2017 Nikayin ................. H02G 3/125
2018/0202637 A1* 7/2018 Sieczkowski ........... F21S 8/036
2019/0376643 A1* 12/2019 Witherbee ................ H02G 3/10
2021/0091551 A1* 3/2021 Anderson .............. H02G 3/105

* cited by examiner

*Primary Examiner* — Pete T Lee

(74) *Attorney, Agent, or Firm* — Stinson LLP

(57) ABSTRACT

A mounting bracket attaches a junction box to a support structure. The mounting bracket includes a body portion and a locking portion attached to the body portion. The body portion includes at least one attachment feature for attaching the mounting bracket to a support structure. The locking portion includes first and second locking arms that extend from the body portion. At least one of the locking arms is receivable within an opening in the junction box. The first and second locking arms may be moveable relative to each other to engage the locking arms, lock the second locking arm to the first locking arm, and secure the mounting bracket to the junction box when the first locking arm is received in the opening in the junction box.

19 Claims, 17 Drawing Sheets

Step 1

Step 2

MOUNTING BRACKET FOR ELECTRICAL BOX

CROSS-REFERENCE TO RELATED APPLICATIONS

This application claims the benefit of U.S. Provisional Patent Application Ser. No. 63/484,036, filed on Feb. 9, 2023, the entire content of which is hereby incorporated by reference.

FIELD OF THE DISCLOSURE

The present disclosure generally relates to a mounting bracket for an electrical box, and more particularly to a snap-in mounting bracket for securing an electrical box to a support in overhead applications.

BACKGROUND OF THE DISCLOSURE

In many applications, it may be useful to support electrical boxes on different support structures, such as ceiling or wall structures of buildings. The present disclosure relates to support brackets, and in particular to support brackets for supporting electrical boxes and related devices. Typically, an electrical or communication device is installed in a building using a mounting bracket. The electrical or communication device is connected to the mounting bracket, and in turn, the mounting bracket is fastened to a support of the building. In some circumstances, junction boxes are used to house and protect electrical and communication devices, such as electrical outlets, electrical switches, associated electrical wiring, communication terminals (e.g., terminals for fiber optics), and associate communication cables (e.g., optical fiber cables). The junction box is secured to the mounting bracket, so that, in turn, the electrical or communication device is secured to the mounting bracket.

BRIEF SUMMARY

In one aspect, the system of the present disclosure includes a mounting bracket for attaching a junction box to a support structure. The mounting bracket includes a body portion and a locking portion attached to the body portion. The body portion includes at least one attachment feature for attaching the mounting bracket to a support structure. The locking portion includes first and second locking arms that extend from the body portion. The first locking arm is receivable within an opening in the junction box. The first and second locking arms are moveable relative to each other to engage the second locking arm with the first locking arm to lock the second locking arm to the first locking arm and secure the mounting bracket to the junction box when the first locking arm is received in the opening in the junction box.

In another aspect, the present disclosure provides a junction box assembly including a junction box and a mounting bracket. The junction box has a back wall that defines a pair of openings spaced less than 2 inches apart. The mounting bracket is configured to attach the junction box to a support structure. The mounting bracket includes a body portion and a locking portion attached to the body portion. The locking portion includes a pair of locking arms configured to be received in respective ones of the pair of openings in the junction box to secure the mounting bracket to the junction box.

In yet another aspect, the present disclosure provides a mounting bracket for attaching a junction box to a support structure. The mounting bracket includes a body portion and a locking portion. The body portion includes at least one attachment feature for attaching the mounting bracket to a support structure. The locking portion is attached to the body portion and includes a pair of locking arms extending from the body portion. The locking arms are spaced less than about 2 inches apart and are receivable within openings in the junction box for securing the mounting bracket to the junction box.

Other aspects will be in part apparent and in part pointed out hereinafter.

DETAILED DESCRIPTION OF THE DISCLOSURE

In general, a box assembly constructed according to the present description includes a mounting bracket and a junction box (e.g., electrical outlet box, electrical switch box, lighting box, fire control box, or the like) coupled to the mounting bracket. The mounting bracket is configured (i.e., designed and constructed) for use in mounting the junction box on a structural support of a building or other structure. The mounting bracket may be configured to have different types of boxes secured thereto. Accordingly, in one or more embodiments, any one of a plurality of different types of boxes and/or boxes of different constructions may be secured to the mounting bracket, effectively making the mounting bracket modular. In addition, the mounting bracket may be configured to be selectively mounted on different types of structural supports and in different ways. In one embodiment, the mounting bracket is configured for mounting the junction box in overhead applications.

Unless specified or limited otherwise, the terms "mounted," "connected," "supported," "secured," and "coupled" and variations thereof are used broadly and encompass both direct and indirect mountings, connections, supports, and couplings. Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

Figure 1:
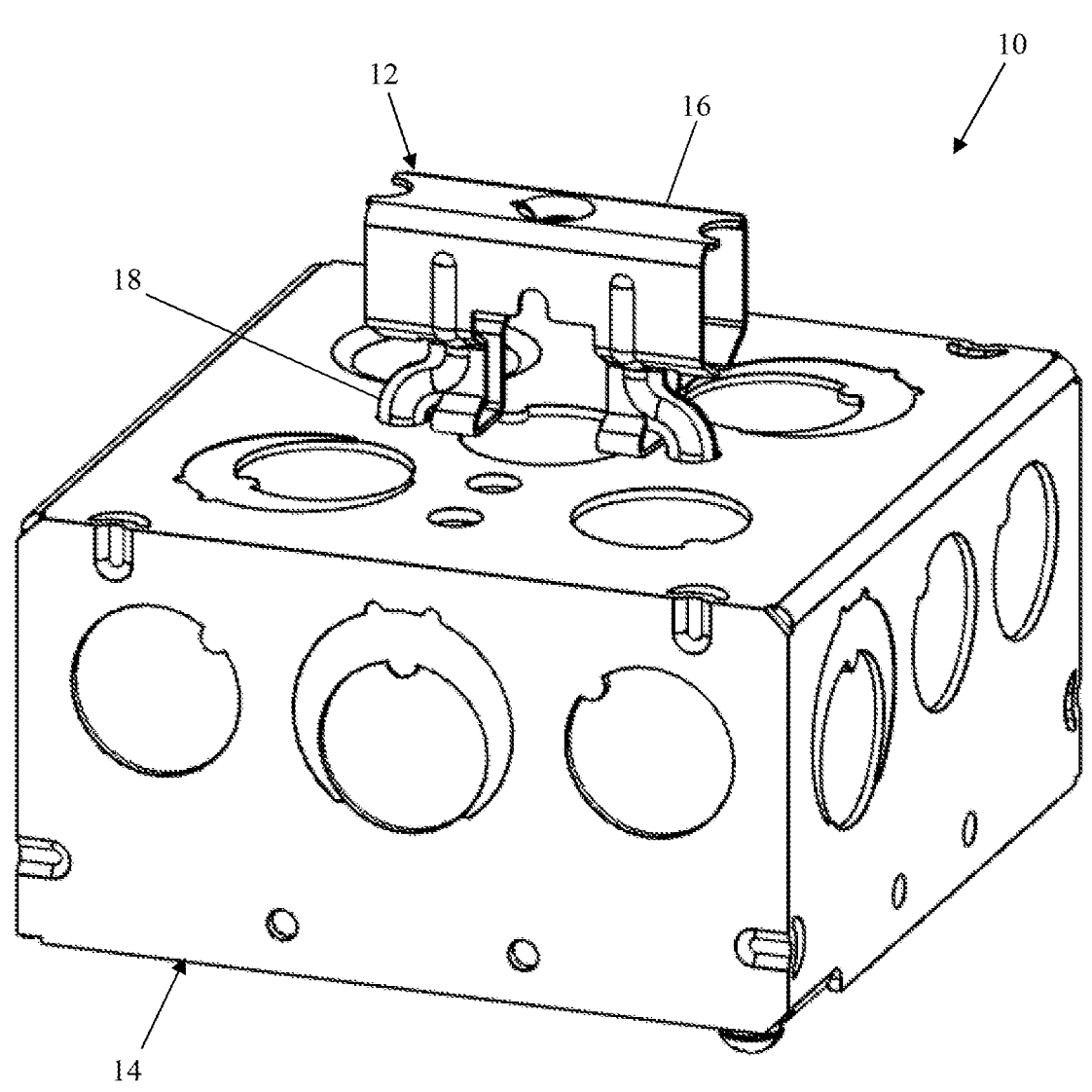
FIG. 1 is a perspective of a box assembly including a mounting bracket and a junction box.
Figure 2:
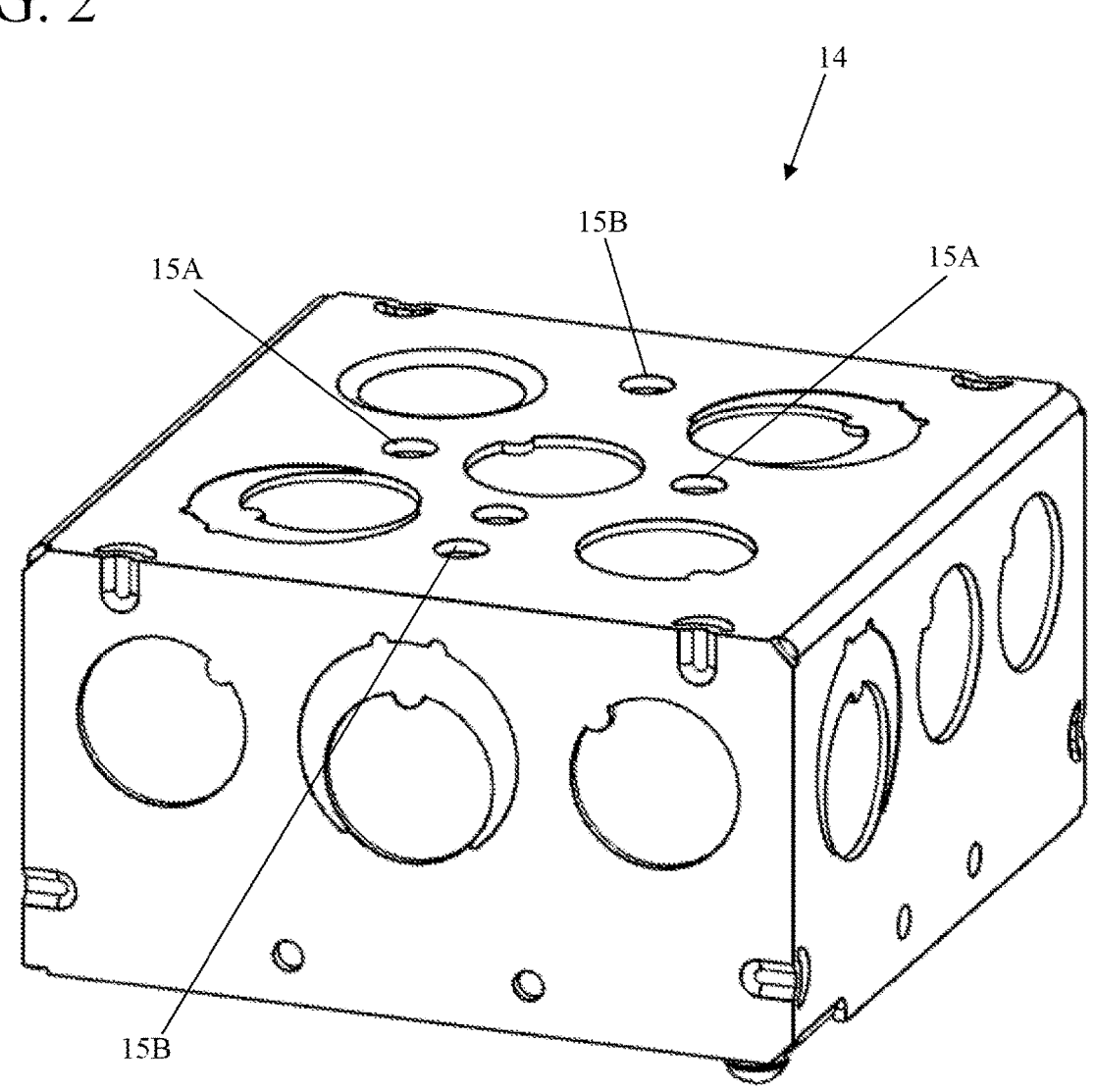
FIG. 2 is a perspective of the junction box.
Figure 3:
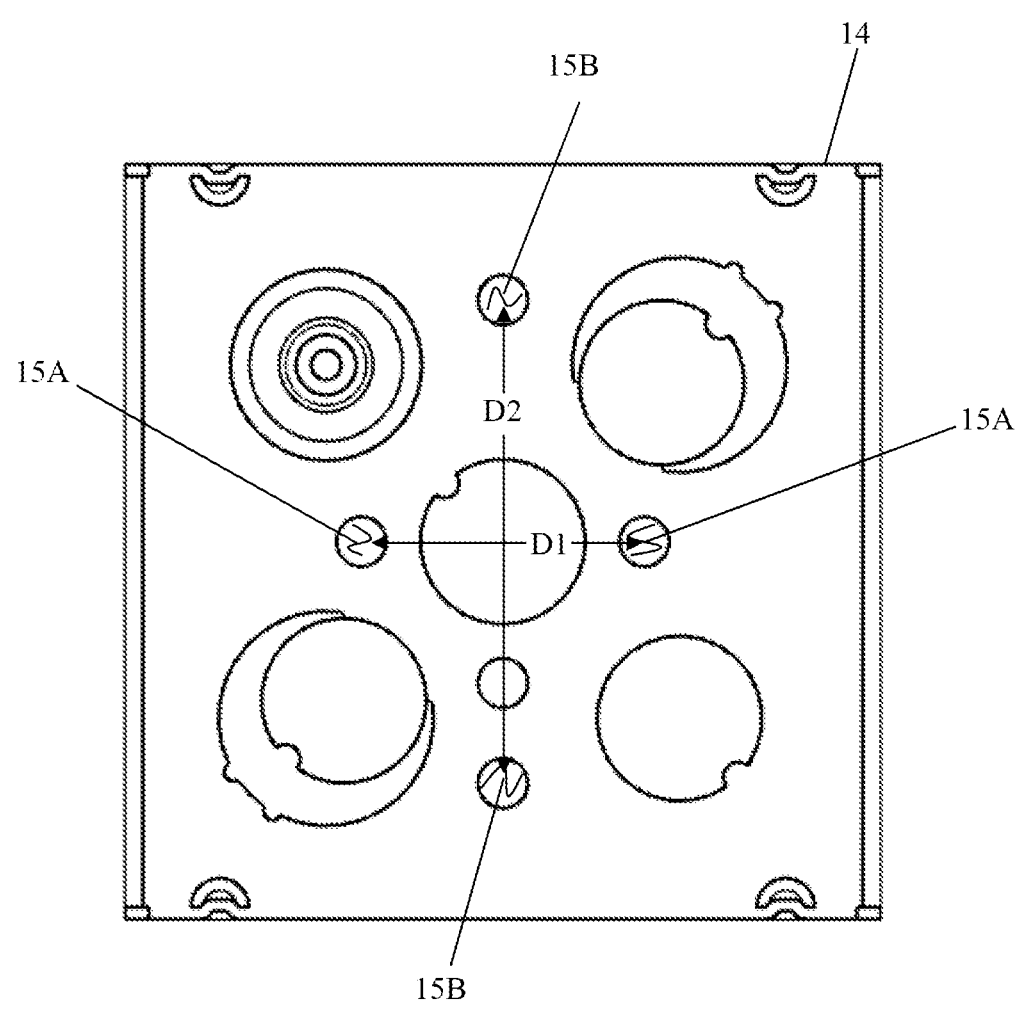
FIG. 3 is a rear view of the junction box.

Referring now to FIGS. 1-3, in one embodiment a box assembly is generally indicated at reference numeral 10. The box assembly 10 generally includes a mounting bracket, generally indicated at 12, and a junction box 14 to which the mounting bracket is securable. In the embodiment shown in FIG. 1, the junction box 14 is a square box (e.g., 4×4 in. box) including a plurality of openings for mounting structure to the box. In particular, a first pair of openings 15A are formed in a back wall of the box 14. The first pair of openings 15A may be centered about a center of the back wall of the box 14. In one embodiment, a center to center distance D1 between the openings 15A is less than 2 inches. In one embodiment, the center to center distance D1 between the openings 15A is about 1 ½ inches. A second pair of openings 15B are also formed in the back wall of the box 14. The second pair of openings 15B may also be centered about the center of the back wall of the box 14. In one embodiment, a center to center distance D2 between the openings 15B is greater than 2 inches. In one embodiment, the center to center distance D2 between the openings 15B is about 2.56 inches. However, it will be understood that the mounting bracket 12 may be secured to a different type of junction box having a different construction. Accordingly, the mounting bracket 12 is configured (i.e., designed and constructed) to have different types of junction boxes and/or boxes of different constructions secured thereto.

The mounting bracket 12 is configured (i.e., designed and constructed) to be mounted on a structural support (e.g., strut, beam, ceiling hanger, threaded rod, tee bars, or the like) of a building or other structure. In non-limiting examples, as explained in more detail below, the box assembly 10 is selectively mountable directly on i) a threaded rod TR (FIG. 16A); ii) a hanger wire HW (FIG. 17A); or iii) multiple acoustic tee bars B1, B2 (FIGS. 18A and 19A); among others. However, it will be understood that the box assembly 10 may be configured to be mounted on structural supports in other ways and on other types of structural supports of a building or other structure.

Referring to FIGS. 4-14, the mounting bracket 12 includes a body portion, generally indicated at 16, and a locking portion, generally indicated at 18, connected to the body portion. In the illustrated embodiment, the body portion 16 and locking portion 18 are integrally formed as a single, one-piece component. However, the body portion 16 and locking portion 18 may be formed separately and subsequently secured to one another to form the mounting bracket 12. In one embodiment, the mounting bracket 12 comprises spring steel. In another embodiment, only a portion of the mounting bracket 12 comprises spring steel. For instance, the body portion 16 may comprise spring steel. Thus, one or more components of the mounting bracket 12 may be resiliently deformable such that components deformed from their natural undeformed state will be urged back to their natural undeformed state. Therefore, the mounting bracket 12 is configured to produce tension within the bracket once the bracket has been deformed. As will be explained below, this tension is configured to help secure the mounting bracket 12 to the junction box 14 in use. However, the mounting bracket 12 could be formed from other materials without departing from the scope of the disclosure. For example, the mounting bracket 12 may be formed from a material that is not configured to produce tension within the bracket when the bracket is deformed and/or in use.

Referring to FIGS. 4-8, 11, 13, and 14, the body portion 16 of the mounting bracket 12 includes a first, upper wall 20 extending along a length L of the body portion, a pair of second, side walls 22 extending (e.g., bent) downward at an angle from opposite longitudinal sides of the upper wall and extending along the length of the body portion, a pair of third, lower walls 24 extending (e.g., bent) downward at an angle from one of the side walls (i.e., right side wall 22 in FIG. 6) and extending along the length of the body portion, and a pair of fourth, lower walls 26 extending (e.g., bent) downward at an angle from the other side wall (i.e., left side wall 22 in FIG. 6) and extending along the length of the body portion. In one embodiment, the right side wall 22 extends at an angle of about 90 degrees from the upper wall 20. In one embodiment, the left side wall 22 extends at an angle of about 110 degrees from the upper wall 20. In one embodiment, the third walls 24 extends at an angle of about 120 degrees from the right side wall 22. In one embodiment, the fourth walls 26 extends at an angle of about 120 degrees from the left side wall 22. Thus, in both the undeformed and deformed states, the second (side) walls 22 generally oppose each other, and the third walls 24 generally oppose the fourth walls 26. A gap G (FIG. 6) is formed between the third and fourth walls 24, 26 when the bracket 12 is in the undeformed state. In one embodiment, the walls configure the body portion 16 to have a general C-shape whereby the upper wall 20 defines a closed upper side and the second, third, and fourth walls 22, 24, 26 define an open lower side forming the gap G between the walls. In the illustrated embodiment, the walls 20, 22, 24, 26 comprise elongate plate members.

Figure 13:
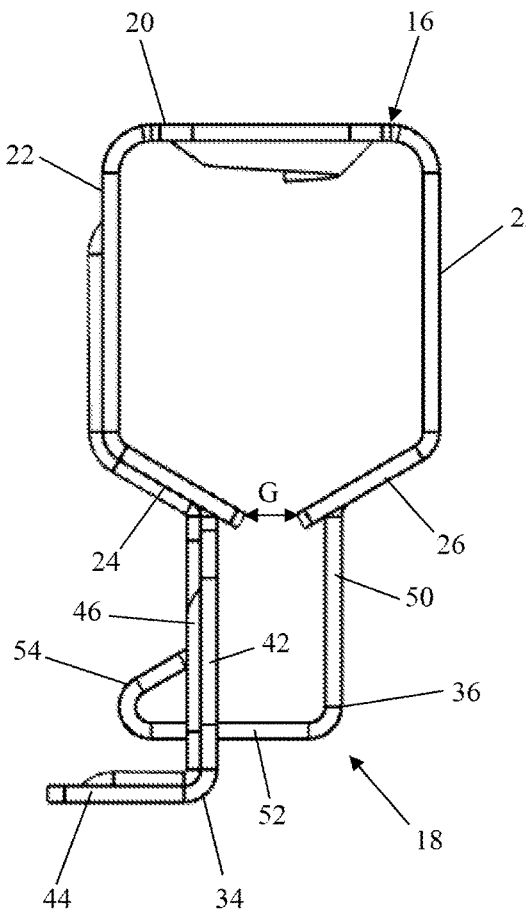
FIG. 13 is a right side view of the mounting bracket in FIG. 7.
Figure 14:
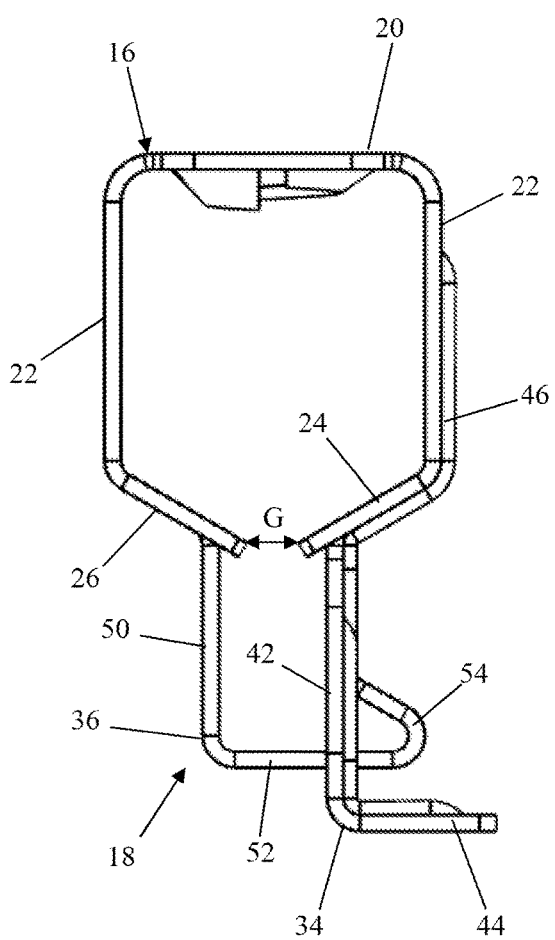
FIG. 14 is a left side view of the mounting bracket in FIG. 7.

However, the walls could have other constructions without departing from the scope of the disclosure. As will be explained in greater detail below, the body portion 16 can be grasped, such as by a tool T (e.g., a wrench), at the second walls 22 and compressed or squeezed causing the gap G between the opposing third and fourth wall 24, 26 to reduce (FIGS. 13 and 14).

Referring to FIGS. 4, 5, and 7-12, the first, upper wall 20 defines an opening 28 located at a center of the upper wall, and a pair of U-shaped cutouts 30 in opposite longitudinal ends of the upper wall. The cutouts 30 are optional and may provide pilot holes for manufacturing. Each side wall 22 comprises a primary section 29 extending generally along the entire length L of the body portion 16, and a pair of end margin sections 31 projecting downward from respective end margins of the primary section. Thus, a recess 33 (FIGS. 9 and 10) is formed between the end margin sections 31. In one embodiment, the recess 33 has a length of about 0.63 inches. In one embodiment, the recess 33 has a length of greater than about 0.62 inches. As will be explained in greater detail below, the recesses 33 define an opening or passage through the mounting structure 12 that is sized to receive mounting structure to locate the bracket on the mounting structure. A pair of U-shaped cutouts 32 may be formed in bottom edges of the primary sections 29 of the side walls 22 within the recesses 33. The cutouts 32 in the sidewalls 22 are disposed about midway along the length L of the body portion 16. The cutouts 32 are also configured to receive mounting structure as will be explained in greater detail below. Additionally, the center opening 28 may be threaded to receive mounting structure as will be explained in greater detail below. Still other constructions of the mounting bracket 12 configure the bracket for mounting to mounting structure. Therefore, the mounting bracket 12 is uniquely configured to be secured to a variety of mounting structure. The cutouts 30, 32 may also be omitted without departing from the scope of the disclosure.

Referring to FIGS. 4, 7-10, and 12, the third walls 24 comprise a primary section 35 extending generally along an entire length of the third wall, and an end margin section 37 projecting downward from an end margin of the primary section. Thus, the end margin sections 37 define a projections extending from the primary sections 35. The end margin sections 37 of the third walls 24 are at an outer or lateral end of the third wall and thus define a portion of the outer edge of the body portion 16. In the illustrated embodiment, the primary section 35 and end margin section 37 comprise contiguous rectangular plate members Similarly, the fourth walls 26 comprise a primary section 39 extending generally along an entire length of the fourth wall, and an end margin section 41 projecting downward from an end margin of the primary section. Thus, the end margin sections 41 define projections extending from the primary sections 39. The end margin sections 41 of the fourth walls 24 are at an outer or lateral end of the fourth wall and thus define a portion of the outer edge of the body portion 16. In the illustrated embodiment, the primary section 39 and end margin section 41 comprise continuous rectangular plate members. As will be explained below, the end margin sections 39 and 41 are configured to engage mounting structure for securing the mounting bracket 12 to the mounting structure. Additionally, it is the end margin sections 37 and 41 of the third and fourth walls 24, 26 which defines the gap G between the walls. However, it will be understood that the third and fourth walls 24, 26 may have other constructions without departing from the scope of the disclosure.

Referring to FIGS. 4-10, 13, and 14, the locking portion 18 of the mounting bracket 12 comprises a pair of first locking arms 34 extending (e.g., bent) downward from respective third walls 24 of the body portion 16, and a pair of second locking arms 36 extending (e.g., bent) downward from respective fourth walls 26 of the body portion. Each of the first locking arms 34 comprises a curved and bent plate member. In particular, the first locking arms 34 comprise a first section 40 extending directly from the primary section 25 of the third wall 24, a second section 42 extending directly from the first section, and a third section 44 extending directly from the second section. The first section 40 comprises a generally rectangular plate member defining a linear bottom edge. The first section 40 may extend from the third wall 24 such that the first section extends generally parallel to the side wall 22 from which the third wall extends. In one embodiment, the first section 40 extends at an angle of about 120 degrees from the third wall 24. The second section 42 comprises a curved plate member that extends laterally outward and downward from a side of the first section 40 generally within the same plane as the first section. Thus, the second section 42 also extends generally parallel to the side wall 22 from which the third wall 24 extends. The third section 44 extends at an angle to the second section 42 to a free end of the first locking arm 34. The third section 44 may comprise a generally rectangular plate member. In one embodiment, the third section 44 extends at an angle of less than 90 degrees form the second section 42. In one embodiment, the third section 44 extends at an angle of about 85 degrees form the second section 42. A pair of ribs 46 may be disposed on an outer surface of the mounting bracket 12. Each rib 46 may extend along a respective locking arm 34 and continue up onto the third wall 24 and side wall 22 from which the third wall extends. The ribs 46 may provide rigidity to the locking arms 34 and body portion 16 as will be explained in greater detail below.

Each of the second locking arms 36 comprises a bent plate member. In particular, the second locking arms 36 comprise a first section 50 extending directly from the primary section 29 of the fourth wall 26, a second section 52 extending directly from the first section, and a third section 54 extending directly from the second section. The first section 50 comprises a generally rectangular plate member. The first section 50 may extend from the primary section 39 of the fourth wall 26 such that the first section extends generally parallel to the side wall 22 from which the fourth wall extends. In one embodiment, the first section 50 extends at an angle of about 120 degrees from the fourth wall 26. The second section 52 comprises a generally rectangular plate member that extends inward and downward from the first section 50 when the bracket 12 is in the undeformed state. In one embodiment, the second section 52 extends at an angle of about 90 degrees from the first section 50. In one embodiment, the second section 52 extends at an angle of greater than 90 degrees from the first section 50. The third section 54 comprises a bent plate member such that the third section projects back toward the first section 50 to a free end of the second locking arm 36. The third section 54 may comprise a curved or bent portion extending directly from the second section 52 and a generally rectangular portion extending directly from the bent portion. Thus, the third section 54 may define a hook or catch configured for engagement with a respective first locking arm 34 of the bracket 12, as will be explained in greater detail below.

Figure 4:
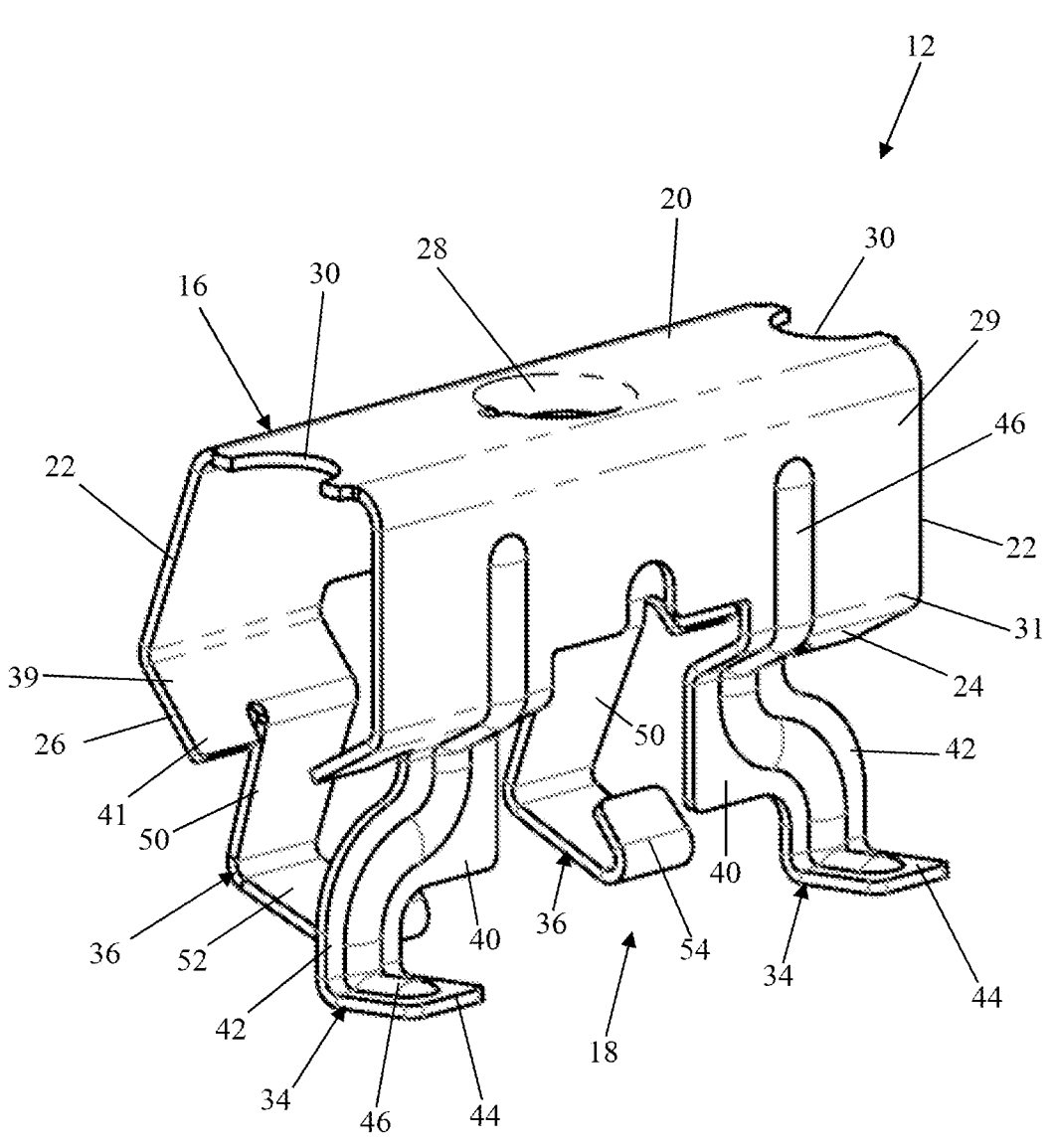
FIG. 4 is a front perspective of the mounting bracket showing the mounting bracket in an undeformed/unlocked state.
Figure 5:
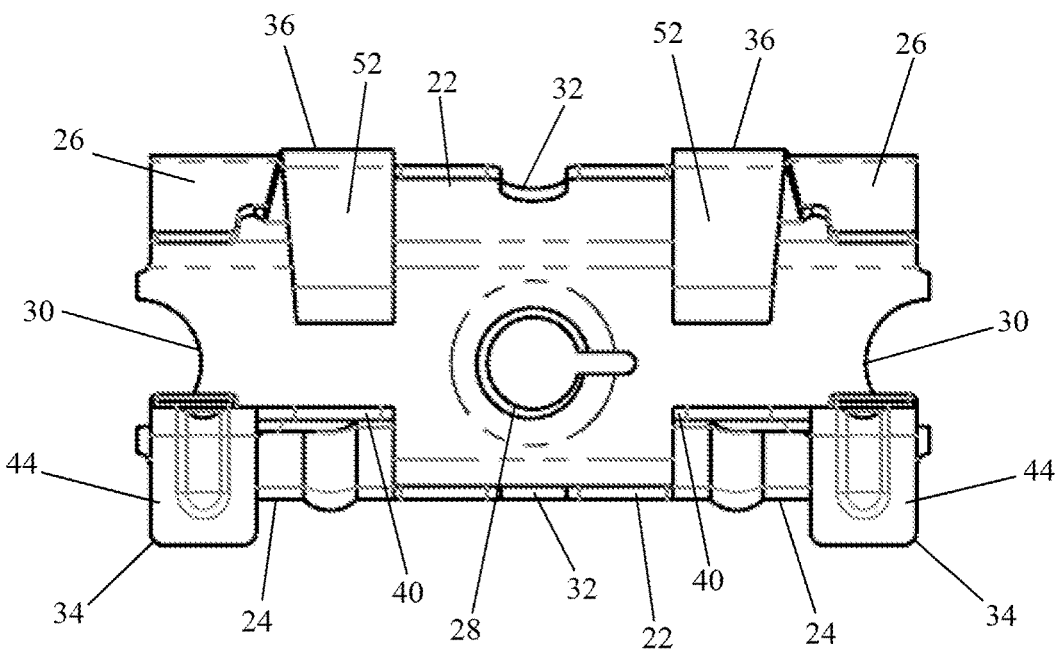
FIG. 5 is a bottom view of the mounting bracket in FIG. 4.
Figure 6:
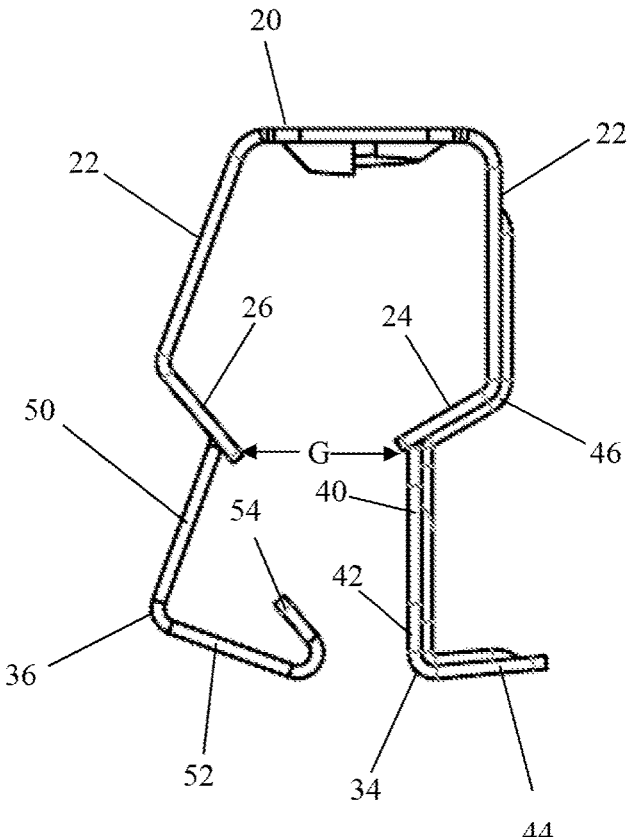
FIG. 6 is a left side view of the mounting bracket in FIG. 4.
Figure 15A:
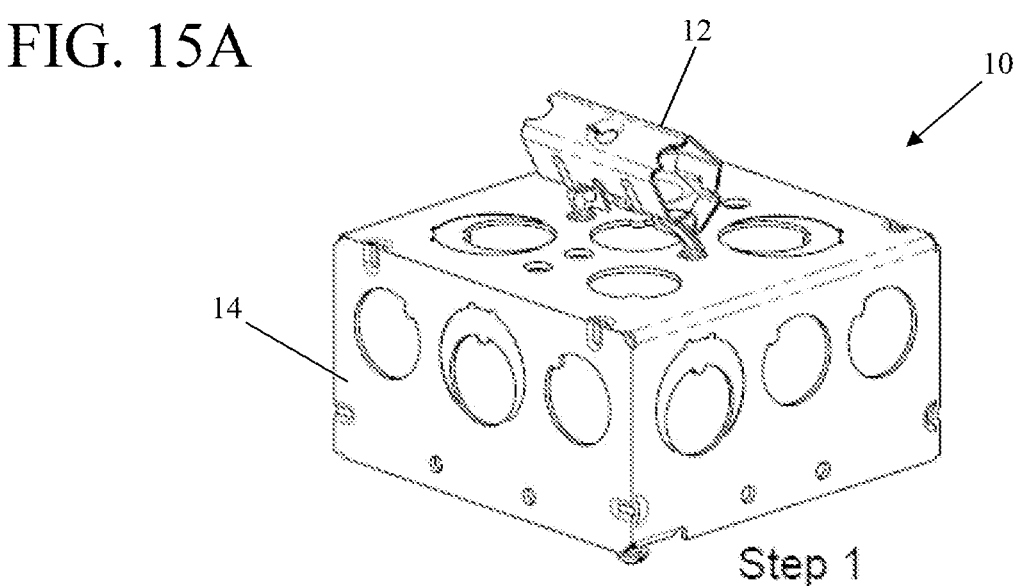
FIG. 15A is a perspective of the box assembly showing a first step of attaching the mounting bracket to the junction box.
Figure 15B:
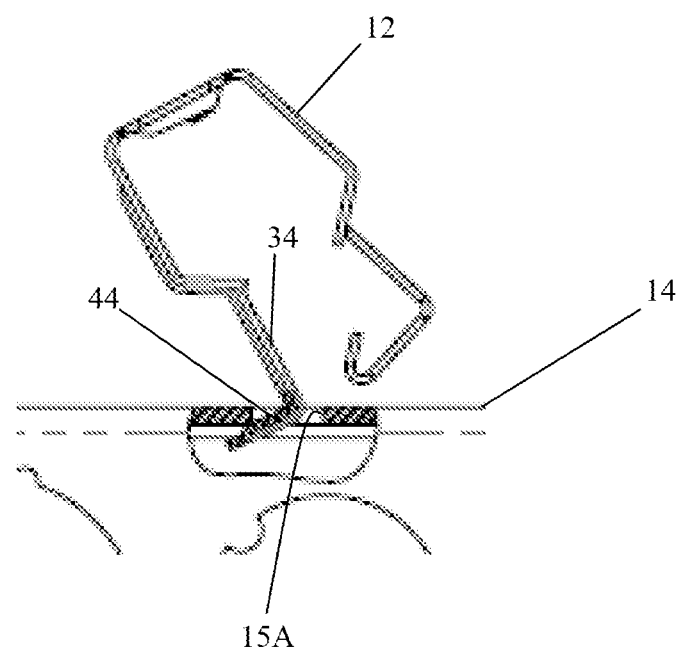
FIG. 15B is a fragmentary view of the box assembly in FIG. 15A including portions of the junction box removed to show underlying detail.

Referring to FIGS. 15A-D, a process of attaching the mounting bracket 12 to the junction box 14 will be described. The mounting bracket 12 may be first provided in the undeformed state as shown in FIG. 4. The bracket 12 can then be positioned adjacent the back wall of the junction box 14 so that the third sections 44 of the first locking arms 34 are disposed in registration with an opening (e.g., openings 15A) in the back wall of the junction box (FIG. 15A). In order to insert the third sections 44 of the first locking arms 34 into the openings 15A in the junction box 14, the mounting bracket 12 must be tilted so that the free ends of the third sections are generally angled downward. This allows for at least partial insertion of the first locking arms into respective openings 15A in the junction box 14. In particular, at least the third sections 44 of the first locking arms 34, or a substantial portion of the third sections, can be inserted into the openings 15A (FIG. 15B).

Figure 7:
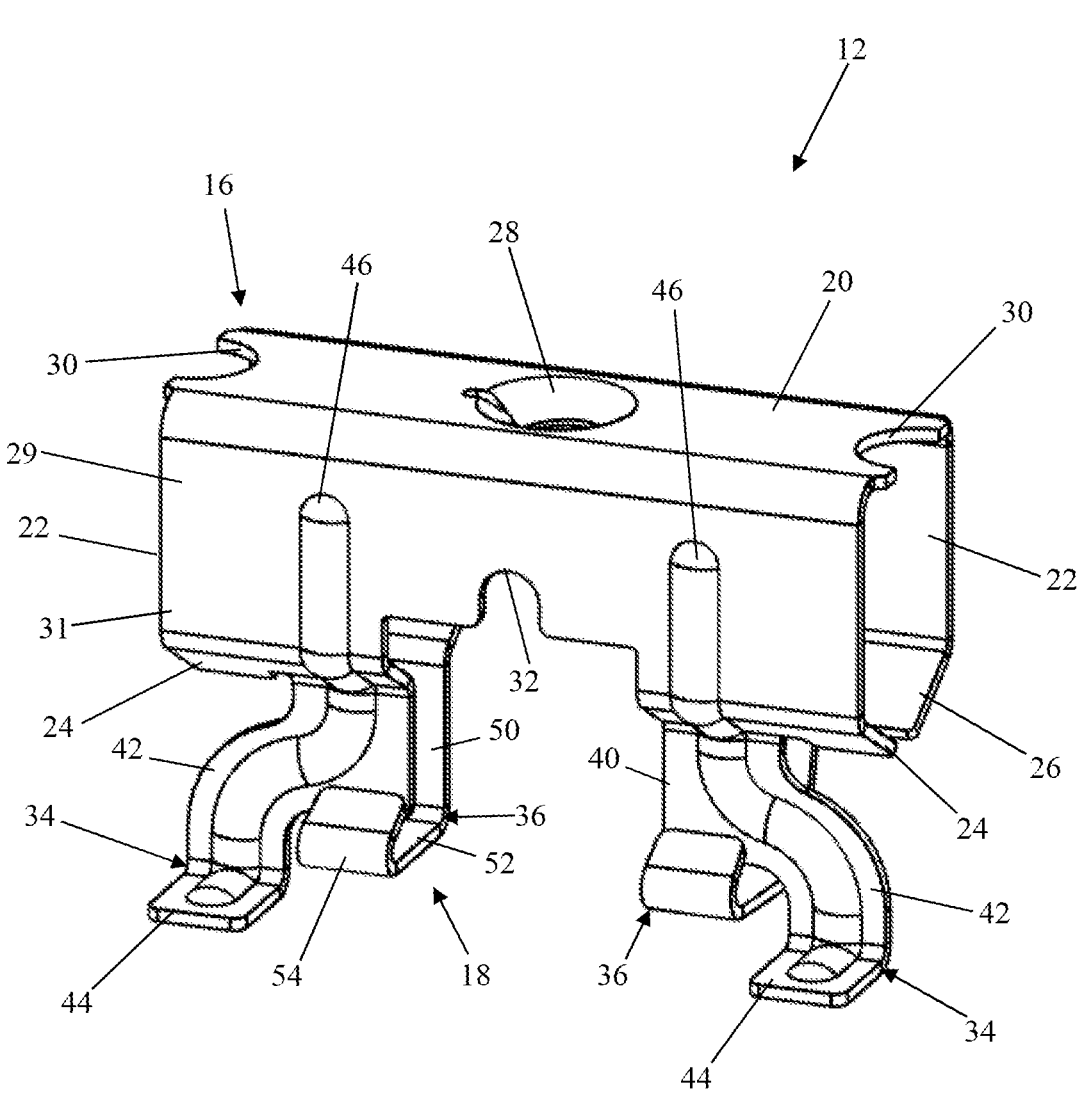
FIG. 7 is a front perspective of the mounting bracket showing the mounting bracket in a deformed/locked state.
Figure 8:
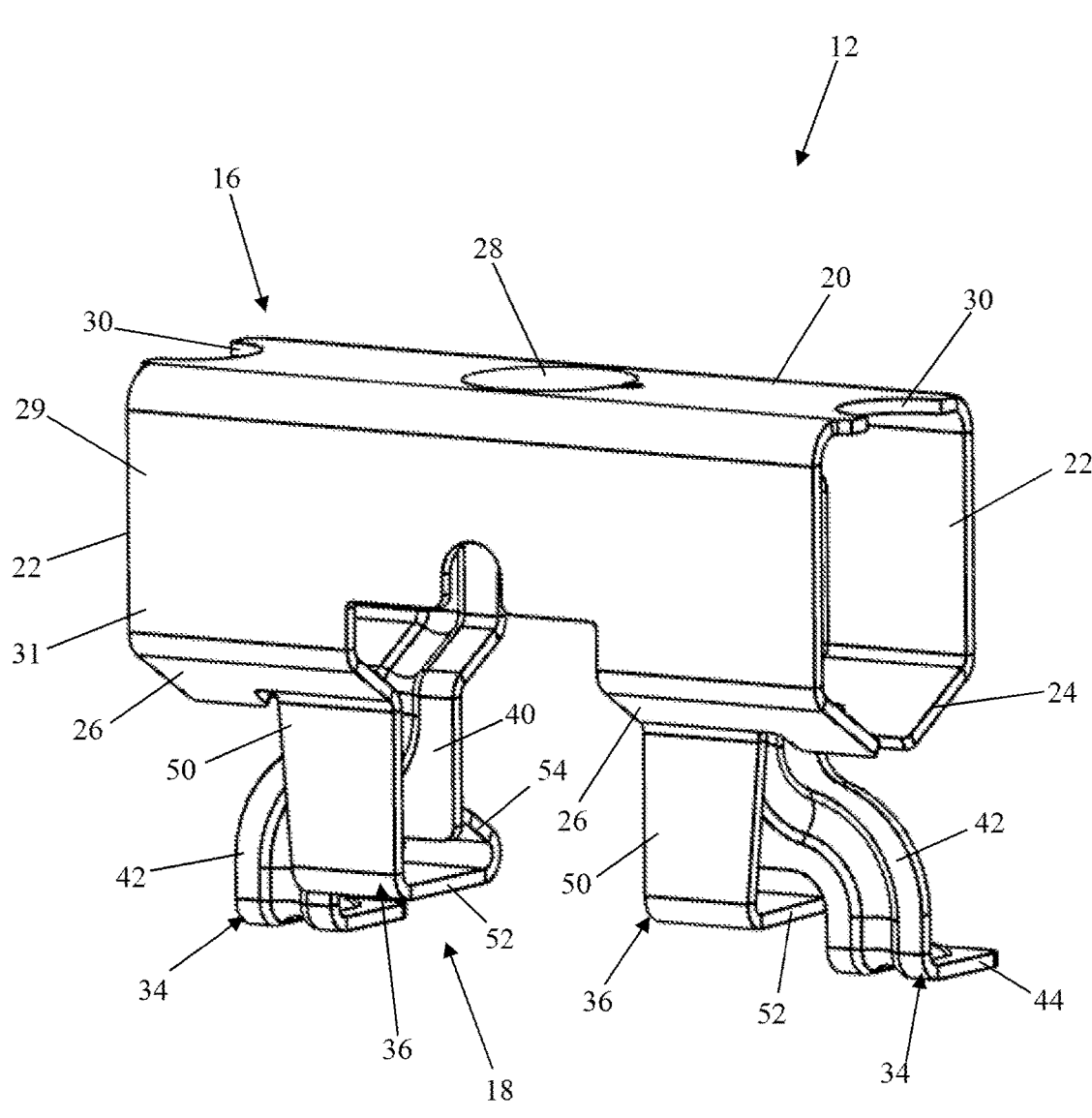
FIG. 8 is a rear perspective of the mounting bracket in FIG. 7.
Figure 9:
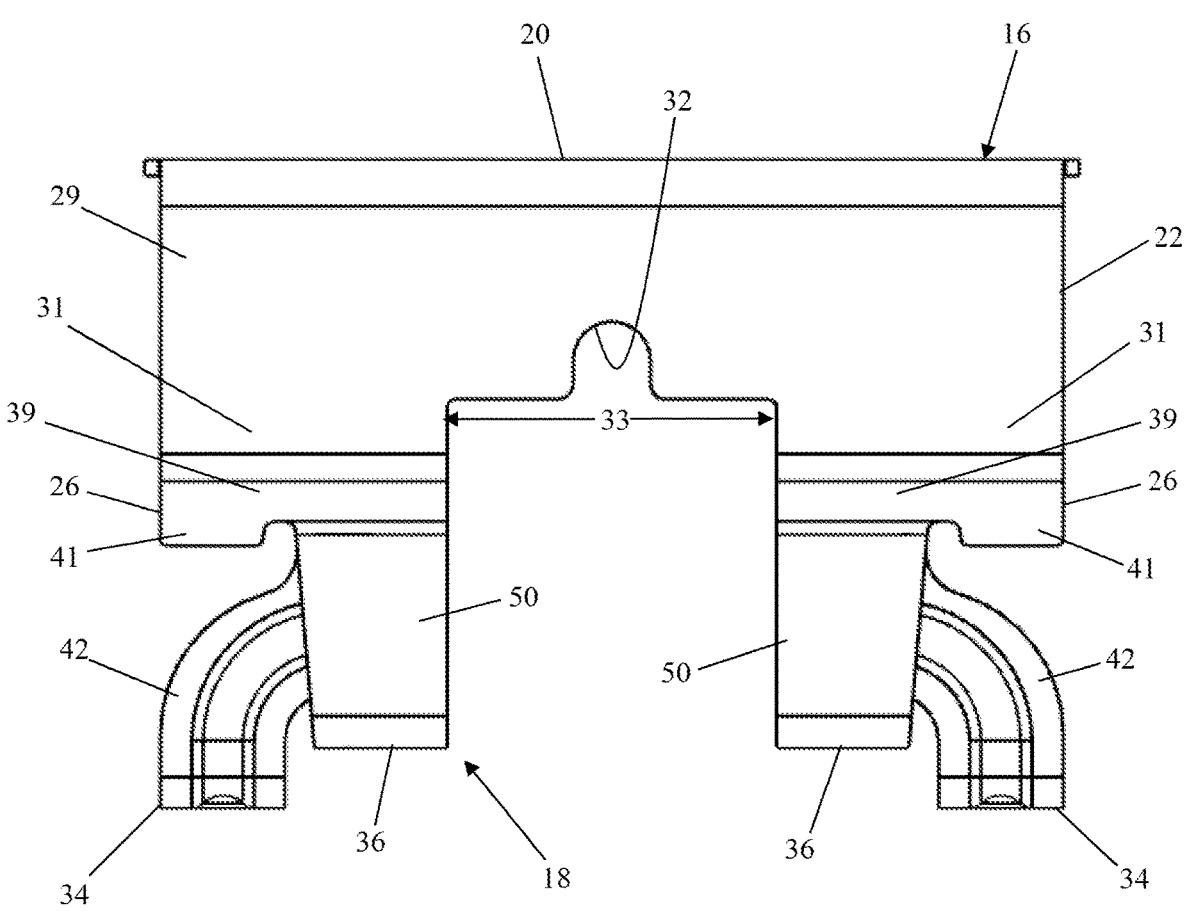
FIG. 9 is a rear view of the mounting bracket in FIG. 7.
Figure 10:
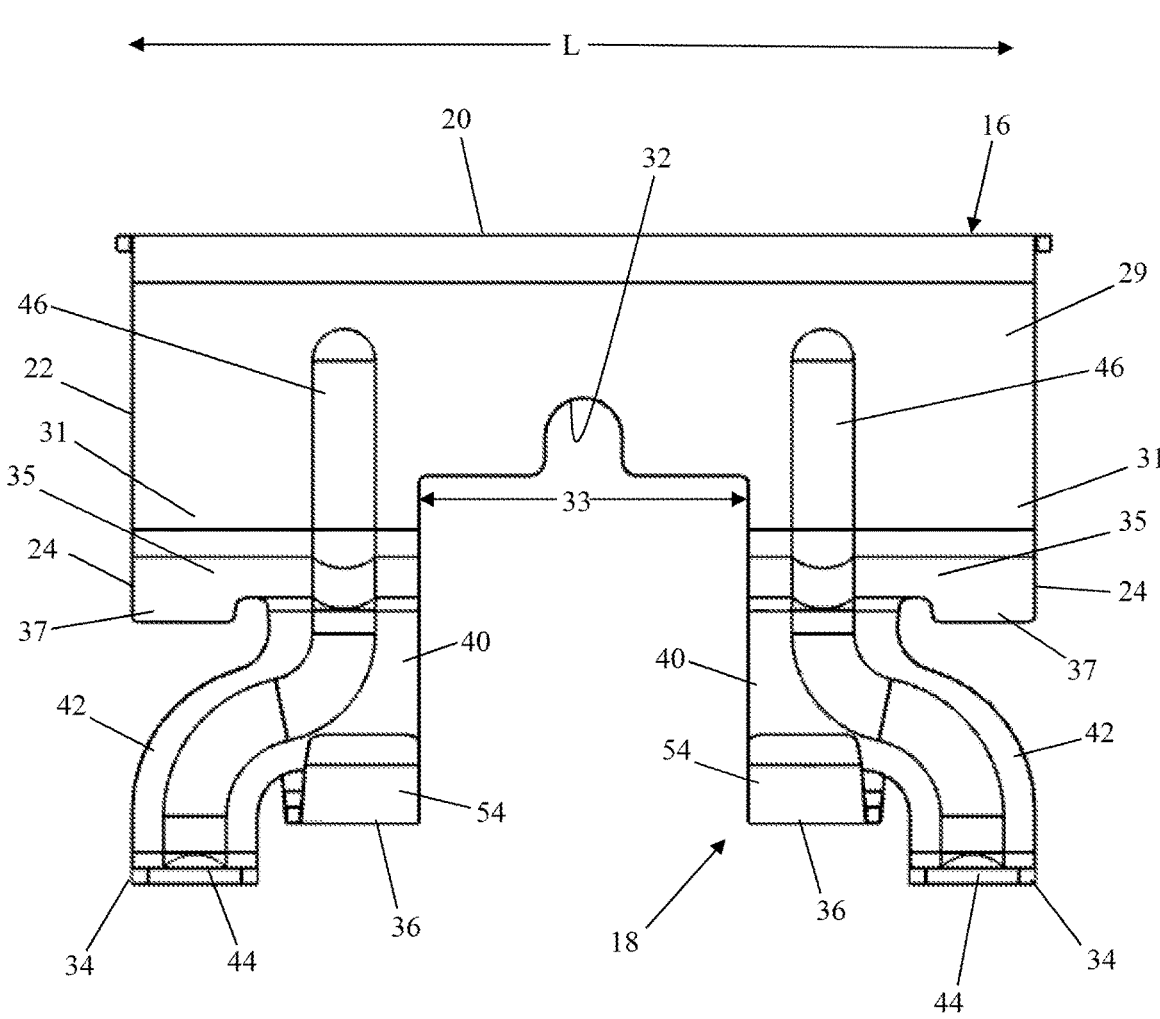
FIG. 10 is a front view of the mounting bracket in FIG. 7.
Figure 11:
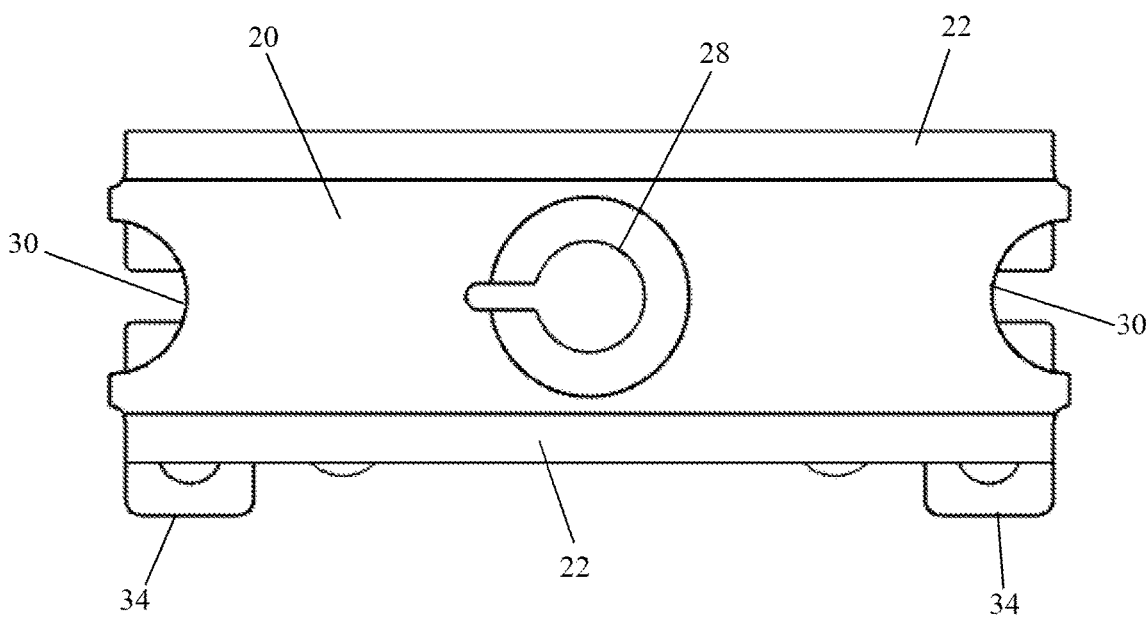
FIG. 11 is a top view of the mounting bracket in FIG. 7.
Figure 12:
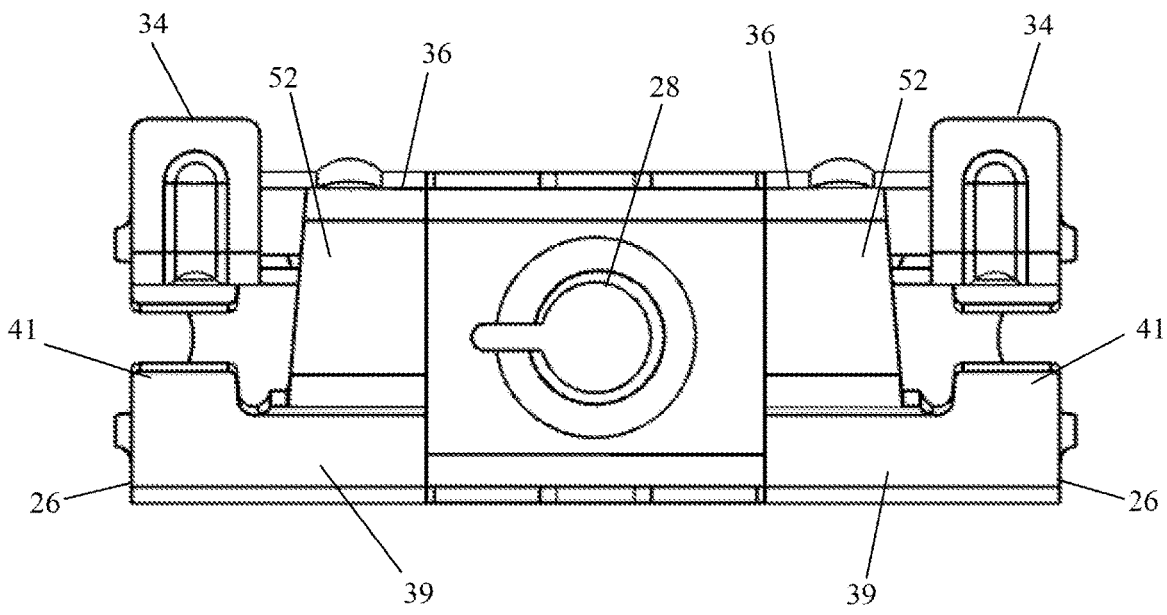
FIG. 12 is a bottom view of the mounting bracket in FIG. 7.
Figure 15C:
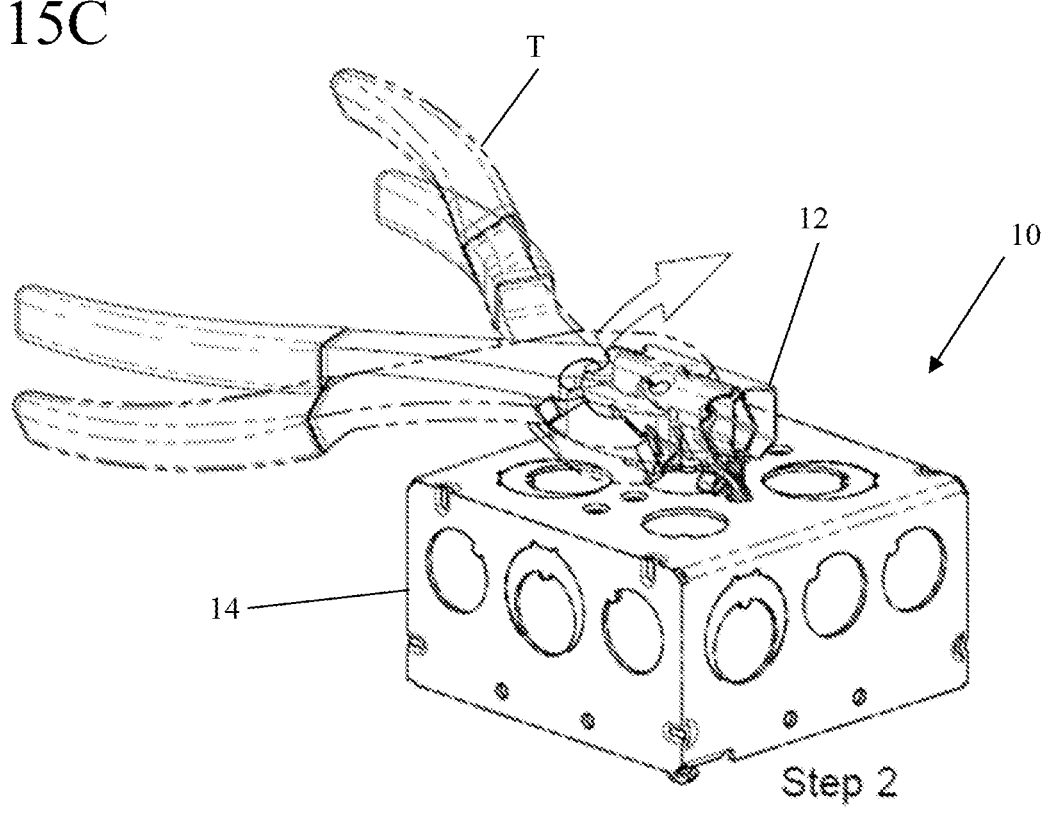
FIG. 15C is a perspective of the box assembly showing a second step of attaching the mounting bracket to the junction box.
Figure 15D:
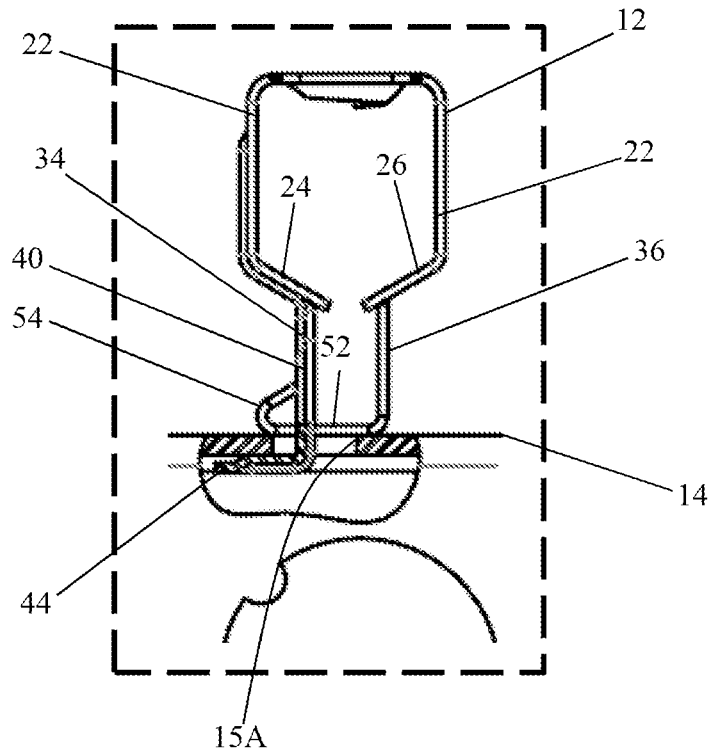
FIG. 15D is a fragmentary view of the box assembly in FIG. 15B including portions of the junction box removed to show underlying detail.

In this position, a tool T (e.g., wrench) can be used to position (e.g., rotate) the mounting bracket 12 so that the upper wall 12 is oriented generally horizontally or parallel with the back wall of the junction box 14 (FIG. 15C). This will in turn orient the third sections 44 of the first locking arms 34 so that at least a portion of the third section opposes an inner surface of the back wall of the junction box 14. Either simultaneously with the rotation of the mounting bracket 12 or after rotating the mounting bracket, the tool T can be actuated to squeeze or compress the side walls 22 together causing the gap G (FIGS. 13 and 14) between the third and fourth walls 24, 26 to close. The side walls 22 can be squeezed to an extent whereby the third sections 54 of the second locking arms 36 clip around the first sections 40 of the first locking arms 34 (FIG. 15D). This configures the mounting bracket in the deformed state (FIG. 7). Because of the hook configuration of the third sections 54, movement of the second locking arms 36 back to their undeformed stated is prevented. Therefore, the locking arms 34, 36 are locked together by a snap-fit engagement. In the locked configuration, the third sections 44 of the first locking arms 34 engage the inner surface of the back wall of the junction box 14, and the third sections 54 of the second locking arms 36 engage an outer surface of the back wall of the junction box and oppose the third sections of the first locking arms. The second sections 52 of the second locking arms 36 may also traverse the openings 15A such that the second locking arms contact the outer surface of the junction box on opposite sides of the openings. This creates a secure and balanced engagement between the mounting bracket 12 and the junction box 14. As described, a tool T is used to tilt and squeeze the mounting bracket. However, in one embodiment, the mounting bracket 12 may be squeezed manually (i.e., without an additional tool) to engage the locking arms 34, 36.

The configuration of the locking arms 34, 36 when the locking arms are engaged with each other creates tension within the mounting bracket and between the mounting bracket and box junction 14 to secure the mounting bracket to junction box. In particular, the material of the mounting bracket 12 allows for elastic deformation of components. Therefore, when the first locking arms 34 are hooked onto the second locking arms 36, the body portion 16 of the mounting bracket exerts a separation force that acts on the locking arms trying to separate the locking arms to restore the mounting bracket to its undeformed state. However, because the hook formation of the third sections 54 of the second locking arms 36 prevents the mounting bracket 12 from restoring itself to its underformed state, a tension force is created between the locking arms which further secures the locking arms in the locked configuration. Also, in one embodiment, the angle between the third sections 44 of the first locking arm 34 and the second sections 42 of the first locking arms is slightly less than 90 degrees. However, when the mounting bracket 12 is rotated into place on the junction box 14 and the locking arms 34, 36 are engaged, the third sections 44 may be flexed outward toward a 90-degree angle. This flexion creates tension in the third sections 44 as they are naturally biased toward the second sections 42.

The ribs 46 on the third sections 44 provide the engagement surface by which the first locking arms 34 engage the inner surface of the junction box 14. The raised configuration of the ribs 46 increases the tension force exerted by the first locking arms 34 on the junction box 14. In particular, the ribs 46 reduce the spacing between the third sections 44 on the first locking arms 34 inside the box 14 and the second sections 52 on the second locking arms 36 outside of the box. This spacing is slightly less than a thickness of the back wall of the junction box 14. As a result, the third sections 44 and second sections 52 exert a gripping force on the inner and outer surfaces of the back wall of the junction box 14 causing a clamping force to be created between the third sections 44 on the first locking arms 34 and the second sections 52 on the second locking arms 36 which oppose the third sections on the outer surface of the back wall of the junction box. This clamping force may be increased when the mounting bracket 12 is placed under load such as when a structural component is attached to the mounting bracket. This load may create a downward force on the mounting bracket 12 in the instance where the junction box 14 is utilized in an overhead application. The ribs 46 also rigidify the first locking arms 34 to withstand the forces exerted within the mounting bracket 12 and the forces exerted on the mounting bracket by the components attached to the mounting bracket.

Additionally, the mounting bracket 12 is selectively coupleable to the junction box 14 in multiple positions. In the illustrated embodiment, the mounting bracket 12 is attached to the junction box 14 through the openings 15A. However, the mounting bracket 12 may also be attached to the junction box 14 by inserting one of the first locking arms 34 into an opening 15A and the other of the first locking arms 34 into an opening 15B. This will change the orientation by which the mounting bracket 12 attaches to the junction box 14. The spacing between the openings 15A and between one opening 15A and an adjacent opening 15B is standardized so that the mounting bracket 12 will be configured for universal attachment to a junction box.

Figure 16A:
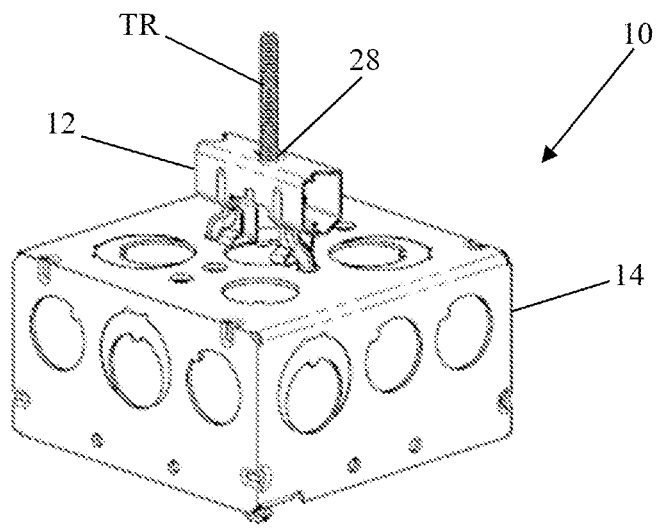
FIG. 16A is a perspective of the box assembly shown attached to a threaded rod.
Figure 16B:
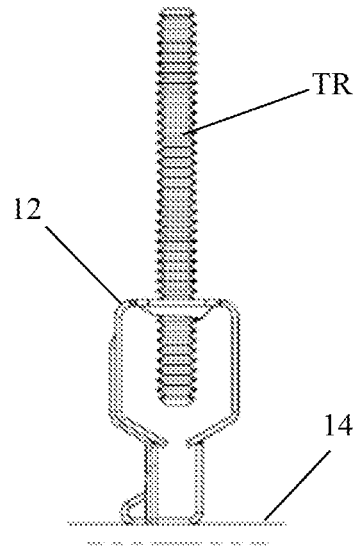
FIG. 16B is a fragmentary side view of the box assembly in FIG. 16A.

Referring to FIGS. 16A and 16B, the box assembly 10 is shown attached to a threaded rod TR. The threaded rod TR can be received through the threaded opening 28 in the mounting bracket 12. A nut (not shown) may be used to secure the threaded rod TR in the opening 28. Thus, the opening 28 may comprise a first attachment feature for attaching the mounting bracket 12 to a support structure.

Figure 17A:
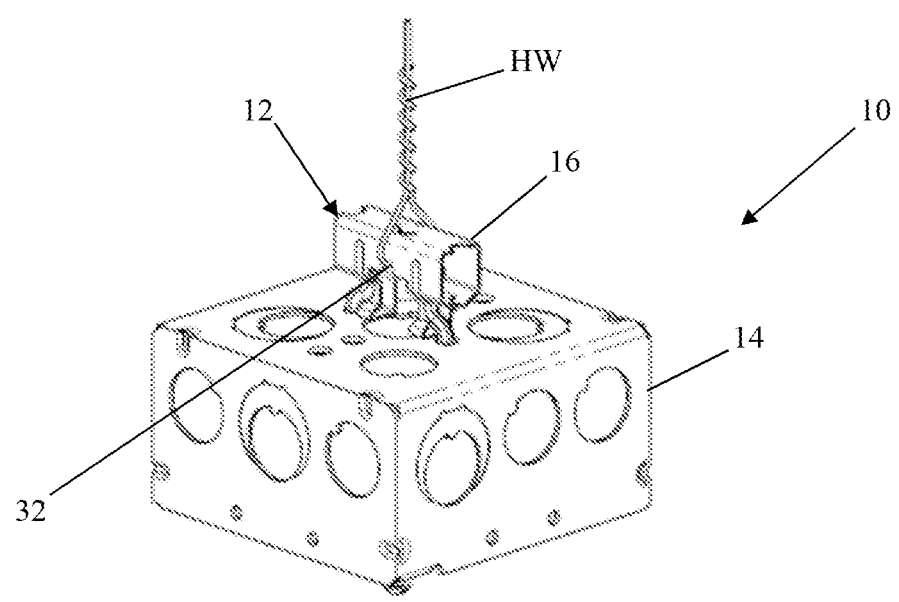
FIG. 17A is a perspective of the box assembly shown attached to a hanger wire.
Figure 17B:
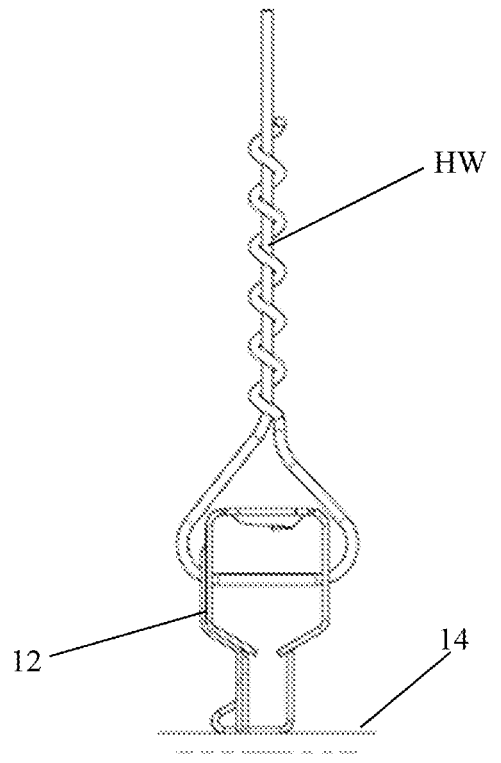
FIG. 17B is a fragmentary side view of the box assembly in FIG. 17A.

Referring to FIGS. 17A and 17B, the box assembly 10 is shown attached to a hanger wire HW. The body portion 16 of the mounting bracket 12 may be inserted into a loop end of the hanger wire HW and the loop end can be received in the cutouts 32 in the body portion to hold the hanger wire in place on the mounting bracket. Thus, the cutouts 32 may comprise second attachment features for attaching the mounting bracket 12 to a support structure. In the embodiments where the cutouts 32 are omitted, the bottom edge of the side walls 22 may comprise the second attachment features.

Figure 18A:
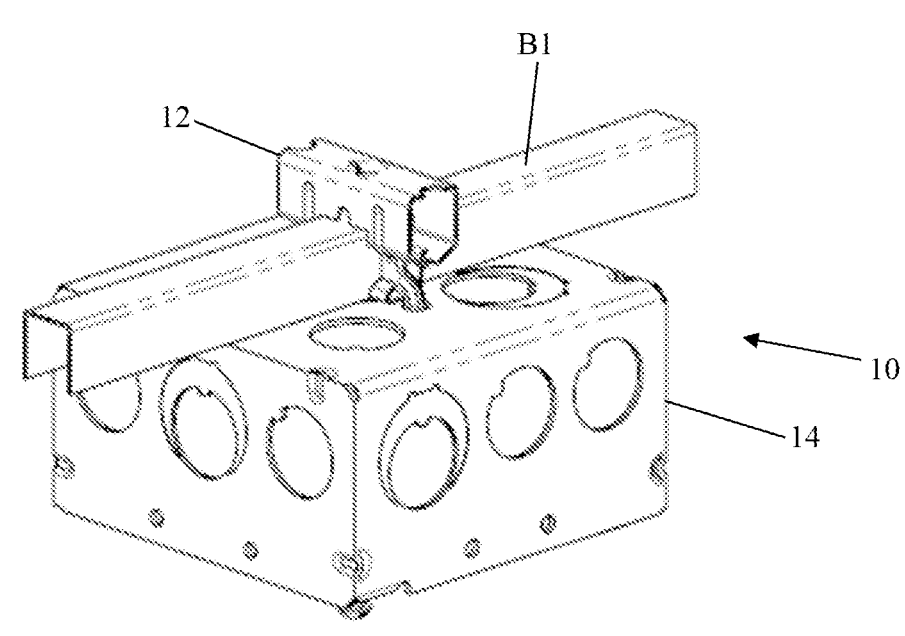
FIG. 18A is a perspective of the box assembly shown attached to a first tee bar.
Figure 18B:
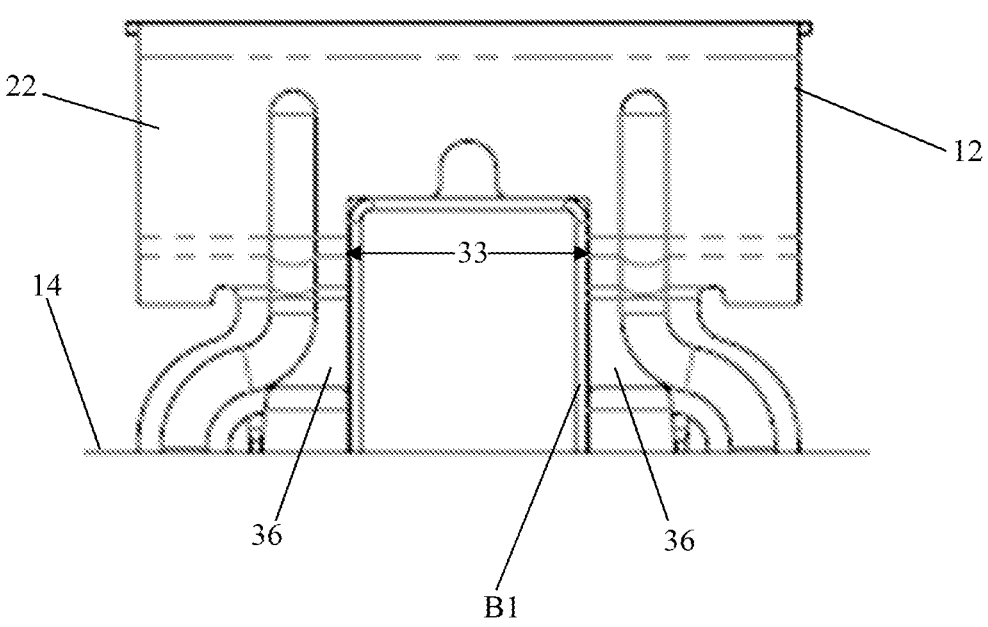
FIG. 18B is a fragmentary side view of the box assembly in FIG. 18A.

Referring to FIGS. 18A and 18B, the box assembly 10 is shown attached to a first bar B1. In this arrangement, the bar B1 is received between the mounting bracket 12 and the junction box 14. In particular, the recess 33 in the side walls 22 of the mounting bracket 12 are sized to receive a width of the bar B1 within a close tolerance so that the bar is held securely within the recess and between the mounting bracket and junction box 14. Thus, the recesses 33 may comprise third attachment features for attaching the mounting bracket 12 to a support structure. The second attachment arms 36 may also extend along lateral sides of the bar B1 to provide additional support retaining the mounting bracket 12 to the bar.

Figure 19A:
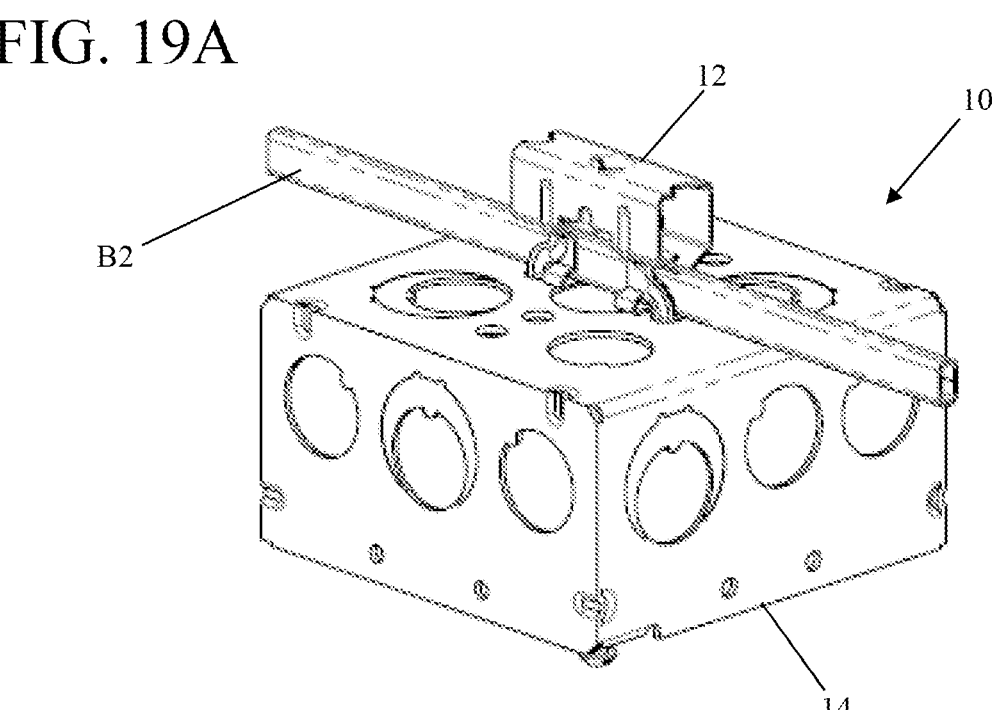
FIG. 19A is a perspective of the box assembly shown attached to a second tee bar.
Figure 19B:
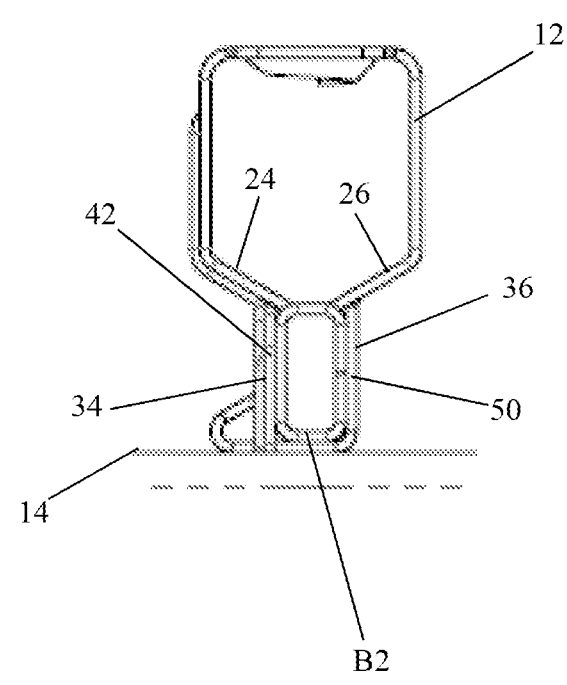
FIG. 19B is a fragmentary side view of the box assembly in FIG. 19A.

Referring to FIGS. 19A and 19B, the box assembly 10 is shown attached to a second bar B2 having a width that is smaller than the first bar B1. In this arrangement, the bar B2 is received between the locking arms 34, 36 of the mounting bracket 12. In particular, the bar B2 may be inserted between the locking arms 34, 36 prior to locking the arms together such that when the locking arms are engaged, the inner surfaces of the locking arms contact outer surfaces of the longitudinal sides of the bar B2 to retain the mounting bracket 12 on the bar. The locking arms 34, 36 therefore prevent lateral movement of the bar B2 relative to the mounting bracket 12. Additionally, the second locking arms 36, and in particular the second sections 52 contact a bottom surface of the bar B2. Thus, the locking arms 34, 36 may comprise fourth attachment features for attaching the mounting bracket 12 to a support structure. The third and fourth walls 24, 26 may also extend to contact an upper side of the bar B2 to provide additional support retaining the mounting bracket 12 to the bar. In this instance, the third and fourth walls 24, 26 along with the second locking arms 36 prevent vertical movement of the bar B2 relative to the mounting bracket 12.

Modifications and variations of the disclosed embodiments are possible without departing from the scope of the invention defined in the appended claims.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A mounting bracket for attaching a junction box to a support structure, the mounting bracket comprising:
   a body portion including at least one attachment feature for attaching the mounting bracket to a support structure; and
   a locking portion attached to the body portion and including a first locking arm extending from the body portion and a second locking arm extending from the body portion, the first locking arm being receivable within an opening in the junction box, the first and second locking arms being moveable relative to each other to engage the second locking arm with the first locking arm to lock the second locking arm to the first locking arm and secure the mounting bracket to the junction box when the first locking arm is received in the opening in the junction box.

2. The mounting bracket of claim 1, further comprising a pair of first locking arms and a pair of second locking arms each extending from the body portion, the first locking arms being engageable with respective second locking arms to lock the first locking arms to the second locking arms.

3. The mounting bracket of claim 2, wherein the first locking arms are spaced apart from one another less than about 2 inches (5.08 cm).

4. The mounting bracket of claim 1, wherein the body portion comprises spring steel to facilitate movement of the locking arms.

5. The mounting bracket of claim 1, wherein the at least one attachment feature includes at least four attachment features for attaching the mounting bracket to a support structure.

6. The mounting bracket of claim 1, wherein the first locking arm is configured to contact an inner surface of a back wall of the junction box, and the second locking arm is configured to contact an outer surface of the back wall of the junction box.

7. The mounting bracket of claim 1, wherein the first and second locking arms are moveable relative to each other between an undeformed state and a deformed state.

8. The mounting bracket of claim 1, wherein the body portion comprises a plurality of walls, wherein at least two walls of the plurality of walls generally oppose each other and define a gap, wherein the gap is reduced when the mounting bracket is in the deformed state.

9. The mounting bracket of claim 8, wherein the first and second locking arms are configured to rebound to the undeformed state after being released from the deformed state.

10. The mounting bracket of claim 1, wherein the first locking arm includes: a first section extending downward from a portion of the body portion; a second section having a curved plate member extending laterally outward and downward from a side of the first section;
    and a third section extending at an angle from the second section and defining a free end of the first locking arm.

11. The mounting bracket of claim 10, wherein the third section of the first locking arm is receivable within the opening in the junction box.

12. The mounting bracket of claim 1, wherein the second locking arm includes: a first section extending downward from a portion of the body portion; a second section extending inward and downward from the first section when the mounting bracket is in an undeformed state; and a third section extending from the second section and having a bent portion.

13. The mounting bracket of claim 12, wherein the bent portion of the third section defines a hook configured to engage the first locking arm.

14. A junction box assembly comprising:
    a junction box having a back wall defining a pair of openings spaced 1.5 inches (3.81 cm) apart; and
    a mounting bracket configured for attaching the junction box to a support structure, the mounting bracket including a body portion and a locking portion attached to the body portion, the locking portion including a pair of locking arms configured to be received in respective ones of the pair of openings in the junction box to secure the mounting bracket to the junction box.

15. The junction box assembly of claim 14, further comprising a pair of first locking arms and a pair of second locking arms each extending from the body portion, one of the first locking arms being receivable in a first opening of the pair of openings in the junction box, and the other of the first locking arms being receivable in a second opening of the pair of openings in the junction box.

16. The junction box assembly of claim 15, wherein the first locking arms are engageable with respective second locking arms to lock the first locking arms to the second locking arms.

17. The junction box assembly of claim 14, wherein a portion of a first locking arm of the pair of locking arms engages an inner surface of the back wall of the junction box and a portion of a second locking arm of the pair of locking arms engages an outer surface of the back wall of the junction box when in a locked configuration.

18. A mounting bracket for attaching a junction box to a support structure, the mounting bracket comprising:

a body portion including at least one attachment feature for attaching the mounting bracket to a support structure; and a locking portion attached to the body portion and including a pair of locking arms extending from the body portion, the locking arms being spaced apart from one another about 1.5 inches (3.81 cm) and receivable within openings in the junction box for securing the mounting bracket to the junction box.

19. The mounting bracket of claim 18, wherein the pair of locking arms comprise first locking arms, the mounting bracket further comprising a pair of second locking arms each extending from the body portion and engageable with respective first locking arms.

\*    \*    \*    \*    \*